US012580733B2

(12) United States Patent
Fletcher et al.

(10) Patent No.: US 12,580,733 B2
(45) Date of Patent: *Mar. 17, 2026

(54) SECURE RE-USE OF PRIVATE KEY FOR DYNAMIC GROUP OF NODES

(71) Applicant: nChain Licensing AG, Zug (CH)

(72) Inventors: John Fletcher, London (GB); Thomas Trevethan, London (GB); Marco Bardoscia, London (GB)

(73) Assignee: NCHAIN LICENSING AG, Zug (CH)

(*) Notice: Subject to any disclaimer, the term of this patent is extended or adjusted under 35 U.S.C. 154(b) by 186 days.

This patent is subject to a terminal disclaimer.

(21) Appl. No.: 18/610,045

(22) Filed: Mar. 19, 2024

(65) Prior Publication Data

US 2024/0235812 A1     Jul. 11, 2024

Related U.S. Application Data

(63) Continuation of application No. 17/877,119, filed on Jul. 29, 2022, now Pat. No. 12,058,233, which is a
(Continued)

(30) Foreign Application Priority Data

| | | | |
|---|---|---|---|
| Apr. 11, 2017 | (GB) | ...................................... | 1705867 |
| Apr. 11, 2017 | (GB) | ...................................... | 1705868 |
| Apr. 11, 2017 | (GB) | ...................................... | 1705869 |

(51) Int. Cl.
*H04L 9/06* (2006.01)
*G06F 21/64* (2013.01)
(Continued)

(52) U.S. Cl.
CPC ............ *H04L 9/0618* (2013.01); *G06F 21/64* (2013.01); *G06Q 20/065* (2013.01); *G06Q 20/36* (2013.01);
(Continued)

(58) Field of Classification Search
CPC ... H04L 9/0618; H04L 9/0637; H04L 9/0825; H04L 9/0833; H04L 9/3239;
(Continued)

(56) References Cited

U.S. PATENT DOCUMENTS 10,269,009 B1     4/2019   Winklevoss et al.
10,805,090 B1    10/2020   Poelstra et al.
(Continued)

FOREIGN PATENT DOCUMENTS

| CN | 105488675 A | 4/2016 |
|---|---|---|
| CN | 106503992 A | 3/2017 |

(Continued)

OTHER PUBLICATIONS

Teutsch et al.: "A scalable verification solution for blockchains," [online], Mar. 7, 2017, pp. 1-44, on the Internet <URL:https://allquantor.at/blockchainbib/pdf/teutsch2017scalable.pdf>, [searched on Mar. 29, 2022].
(Continued)

*Primary Examiner* — Quazi Farooqui
(74) *Attorney, Agent, or Firm* — Tarolli, Sundheim, Covell & Tummino LLP

(57) ABSTRACT

Provided herein are a process, an apparatus, and an article of manufacture for confiscating a digital asset due to malicious members or malicious attacks. A process in the form of a computer-implemented method includes: i) detecting malicious activity by a malicious party, wherein the malicious party is one of the other members of the a congress; and ii) confiscating at least a portion of digital assets previously transferred to the a public group address by the malicious party. Security mechanisms disclosed herein for confiscating a digital asset leverage the use of a congress that is secured, in part, through distributed generation of private key share. The security mechanisms further allow a self-governing,
(Continued)

decentralized group to be formed, with the threshold signature scheme allowing the group to control digital assets encumbered by a public key associated with the group.

13 Claims, 8 Drawing Sheets

Related U.S. Application Data continuation of application No. 16/604,961, filed as application No. PCT/IB2018/052470 on Apr. 9, 2018, now Pat. No. 11,403,622.

(51) Int. Cl.

| | |
|---|---|
| *G06Q 20/06* | (2012.01) |
| *G06Q 20/36* | (2012.01) |
| *G06Q 20/38* | (2012.01) |
| *H04L 9/08* | (2006.01) |
| *H04L 9/32* | (2006.01) |
| *H04L 9/00* | (2022.01) |

(52) U.S. Cl.

CPC ....... *G06Q 20/3829* (2013.01); *G06Q 20/389* (2013.01); *H04L 9/0637* (2013.01); *H04L 9/0825* (2013.01); *H04L 9/0833* (2013.01); *H04L 9/3239* (2013.01); *H04L 9/3247* (2013.01); *H04L 9/3252* (2013.01); *H04L 9/3255* (2013.01); *G06Q 2220/00* (2013.01); *H04L 9/50* (2022.05); *H04L 2209/463* (2013.01); *H04L 2209/56* (2013.01)

(58) Field of Classification Search

CPC ... H04L 9/3247; H04L 9/3252; H04L 9/3255; H04L 9/50; H04L 2209/463; H04L 2209/56; H04L 9/06; G06F 21/64; G06Q 20/065; G06Q 20/36; G06Q 20/3829; G06Q 20/389; G06Q 2220/00

See application file for complete search history.

(56) References Cited

U.S. PATENT DOCUMENTS

| | | | |
|---|---|---|---|
| 10,984,470 B1 | 4/2021 | Winklevoss et al. | |
| 2005/0021740 A1* | 1/2005 | Bar ..................... | H04L 63/145 |
| | | | 709/224 |
| 2014/0156711 A1* | 6/2014 | Sharan ................. | G06F 16/212 |
| | | | 707/804 |
| 2015/0227883 A1 | 8/2015 | Murphy, Jr. | |
| 2015/0287026 A1 | 10/2015 | Yang et al. | |
| 2015/0304736 A1 | 10/2015 | Lal et al. | |
| 2016/0012424 A1 | 1/2016 | Simon et al. | |
| 2016/0052416 A1 | 2/2016 | Wietfeld et al. | |
| 2016/0134593 A1 | 5/2016 | Gvili | |
| 2016/0321751 A1 | 11/2016 | Creighton, IV et al. | |
| 2016/0330034 A1 | 11/2016 | Back et al. | |
| 2016/0335533 A1 | 11/2016 | Davis et al. | |
| 2016/0342977 A1 | 11/2016 | Lam | |
| 2016/0344550 A1 | 11/2016 | Anton et al. | |
| 2016/0379212 A1 | 12/2016 | Bowman et al. | |
| 2017/0046638 A1 | 2/2017 | Chan et al. | |
| 2017/0220815 A1 | 8/2017 | Ansari et al. | |
| 2017/0331896 A1 | 11/2017 | Holloway et al. | |
| 2018/0227275 A1 | 8/2018 | Russinovich et al. | |
| 2018/0276626 A1 | 9/2018 | Laiben | |
| 2019/0394047 A1 | 12/2019 | Karame et al. | |
| 2020/0341689 A1 | 10/2020 | Smith | |

FOREIGN PATENT DOCUMENTS

| | | | |
|---|---|---|---|
| JP | 2002288555 A | 10/2002 | |
| JP | 2010506312 A | 2/2010 | |
| JP | 7012741 B2 | 1/2022 | |

OTHER PUBLICATIONS

Jain et al.: "How to verify computation with a rational network," Jun. 19, 2016, 16 pages.

Antonopoulos et al., "Bitcoin Book," GitHub, retrieved from https://github.com/bitcoinbook/bitcoinbook, Jun. 8, 2017, 4 pages.

Antonopoulos, "Mastering Bitcoin—Unlocking Digital Cryptocurrencies," O'Reilly Media, Inc., Dec. 20, 2014, 282 pages.

Bitfury Group, "Proof of Stake Versus Proof of Work," White Paper, Sep. 13, 2015, 26 pages.

Bitshares, "Delegated Proof-of-Stake Consensus," Bitshares.org, retrieved via the waybackmachine: http://web.archive.org/web/20161102133058/https://bitshares.org/technology/delegated-proof-of-stake-consensus/, Nov. 2, 2016, 6 pages.

Bitslog, "Drivechains vs Sidechains," Bitslog, retrieved from https://bitslog.com/2016/10/07/drivechains-vs-sidechains/, 2021, 2 pages.

Boneh et al., "Aggregate and Verifiably Encrypted Signatures from Bilinear Maps," retrieved from http://crypto.stanford.edu/~dabo/papers/aggreg.pdf, 22 pages.

Buterin, "Chain Interoperability," Sep. 9, 2016, 25 pages.

Casper, "How does the Casper proof of stake algorithm work?" retrieved from https://ethereum.stackexchange.com/questions/102/how-does-the-casper-proof-of-stakealgorithm-work, Apr. 28, 2017, 2 pages.

Dilley et al., "Strong Federations: A Interoperable Blockhain Solution to Centralized Third-Party Risks", Jan. 30, 2017, 14 pages.

Fuchita, "Special Topic: Innovation and Finance, Blockchain and Financial Transaction Innovation," Nomura Capital Market Quarterly 19-2(74):11-35, Nov. 1, 2015.

Goldfeder et al., "Securing Bitcoin Wallets via a New DSA/ECDSA threshold signature scheme," manuscript, https://www.cs.princeton.edu/~stevenag/threshold_sigs.pdf, 2015 [retrieved Jun. 21, 2018], 26 pages.

Higashikado et al., "A Study on Certificate Management in Consortium Chain", A Study on certificate management in consortium chain, proceedings of 2017 Symposium on Cryptography and Information Security, Japan, Jan. 24, 2014, 8 pages.

Ibrahim, "SecureCoin: A Robust Secure and Efficient Protocol for Anonymous Bitcoin Ecosystem," International Journal of Network Security 19(2):295-312, http://ijns.jalaxy.com.tw/contents/ijns-v19-n2/ijns-2017-v19-n2-p295-312.pdf, Mar. 2017, 18 pages.

International Search Report and Written Opinion for Application No. PCT/IB2018/052470, mailed Jun. 11, 2018, filed Apr. 9, 2018, 10 pages.

International Search Report and Written Opinion for Application No. PCT/IB2018/052471, mailed Jun. 12, 2018, filed Apr. 9, 2018, 11 pages.

International Search Report and Written Opinion for Application No. PCT/IB2018/052472, mailed Jun. 11, 2018, filed Apr. 9, 2018, 10 pages.

Lerner, "Rootstock White Paper" retrieved from http://www.theblockchain.com/docs/Rootstock-WhitePaper-Overview.pdf, Nov. 19, 2015, 24 pages.

Lewis, "Orisi White Paper," GitHub, retreived from https://github.com/orisi/wiki/wiki/Orisi-White-Paper, Nov. 29, 2014, 5 pages.

Maxwell, "The First Successful Zero-Knowledge Contingent Payment," Bitcoin Core, retrieved from https://bitcoincore.org/en/2016/02/26/zero-knowledge-contingent-payments-announcement/, Feb. 26, 2016, 5 pages.

Nakamoto, "Bitcoin: A Peer-to-Peer Electronic Cash System," Bitcoin, Oct. 31, 2008, https://bitcoin. org/bitcoin.pdf, 9 pages.

Narayanan et al., "Bitcoin and Cryptocurrency Technologies," Princeton University Press, Feb. 9, 2016, 308 pages.

Pratyush et al., "Efficient weighted threshold ECDSA for securing bitcoin wallet," 2017 ISEA Asia Security and Privacy (ISEASP), http://ieeexplore.ieee.org/document/7976994/, Jan. 29, 2017, 10 pages.

Reddit, "How an Anchored Proof of Stake Sidechain Can Help the Bitcoin Main Chain," retrieved from https://www.reddit.com/r/Bitcoin/comments/5vy4qc/how_an_anchored_proof_of_stake_sidec hain_can_help/, Feb. 24, 2017, 9 pages.

Rootstock FAQ, "Roodstock FAQ," retreived from https://www.rsk.co/faqs, 2018, 9 pages.

(56) References Cited

OTHER PUBLICATIONS

Satoshi et al., "Connection Limits," Bitcoin Forum, Aug. 9, 2010, https://bitcointalk.org/index.php?topic=741.0;prev_next=prev, 2 pages.
Stathakopoulou et al., "Threshold Signatures for Blockchain Systems," retrieved from https://domino.research.ibm.com/library/cyberdig.nsf/papers/CA80E201DE9C8A0A852580FA004D412F/$File/rz3910.pdf, Apr. 4, 2017, 42 pages.
UK Commercial Search Report mailed Apr. 28, 2017, Patent Application No. GB1705869.4, 5 pages.
UK Commercial Search Report mailed Jun. 2, 2017, Patent Application No. GB1705867.8, 8 pages.
UK Commercial Search Report mailed Jun. 5, 2017, Patent Application No. GB1705868.6 , 6 pages.
UK IPO Search Report mailed Sep. 15, 2017, Patent Application No. GB1705868.6, 6 pages.
UK IPO Search Report mailed Sep. 15, 2017, Patent Application No. GB1705869.4, 4 pages.

UK IPO Search Report mailed Sep. 6, 2017, Patent Application No. GB1705867.8, 6 pages.
Wikipedia, "Zero Knowledge Contingent Payment," Bitcoin Wiki, retrieved from https://en.bitcoin.it/wiki/Zero_Knowledge_Contingent_Payment, Apr. 8, 2020, 3 pages.
Wood et al., "Polkadot: Vision for A Heterogeneous Multi-Chain Framework," retrieved from https://github.com/ polkadot-io/ polkadotpaper, Sep. 10, 2016, 21 pages.
Higashikado et al., "A Study on Certificate Management in Consortium Chain", A Study on certificate management in consortium chain, proceedings of 2017 Symposium on Cryptography and Information Security, Japan, (with English abstract) Jan. 24, 2014, 16 pages.
Learner, Sergio Demain, "Drivechains, Sidechains and Hybrid 2-Way Peg Designs," RSK Labs Ltd, Revision 9, Apr. 1, 2016, 31 pages.
elastos.org, "Elastos Sidechain White Paper," Smartweb Powered by Blockchain, Mar. 25, 2017, 11 pages.

* cited by examiner

200

1000

Join Congress — 1002

Form Bonded Validator Set — 1004

Detect Special Transaction — 1006

Mint Digital Asset — 1008

Detect Request to Transfer Back — 1010

Transfer Back with Private Key Share — 1012

SECURE RE-USE OF PRIVATE KEY FOR DYNAMIC GROUP OF NODES

CROSS-REFERENCE TO RELATED APPLICATIONS

This application is a continuation of U.S. patent application Ser. No. 17/877,119, filed Jul. 29, 2022, entitled "SECURE RE-USE OF PRIVATE KEY FOR DYNAMIC GROUP OF NODES" which is a continuation of U.S. patent application Ser. No. 16/604,961, filed Oct. 11, 2019, now U.S. Pat. No. 11,403,622, entitled "SECURE RE-USE OF PRIVATE KEY FOR DYNAMIC GROUP OF NODES," which is a 371 of International Patent Application No. PCT/IB2018/052470, filed Apr. 9, 2018, entitled, "SECURE RE-USE OF PRIVATE KEY FOR DYNAMIC GROUP OF NODES," which claims priority to United Kingdom Patent Application No. 1705867.8, filed Apr. 11, 2017, entitled "COMPUTER-IMPLEMENTED SYSTEM AND METHOD," and United Kingdom Patent Application No. 1705869.4, filed Apr. 11, 2017, entitled "COMPUTER-IMPLEMENTED SYSTEM AND METHOD," and United Kingdom Patent Application No. 1705868.6, filed Apr. 11, 2017, entitled "COMPUTER-IMPLEMENTED SYSTEM AND METHOD," the disclosures of which are incorporated herein by reference in their entirety.

TECHNICAL FIELD

This invention relates generally to distributed ledgers, and more particularly to methods and systems for providing decentralized control over digital assets associated with a digital ledger.

The invention is particularly suited, but not limited to, use in enabling a two-way peg between a proof-of-work blockchain network and a proof-of-stake blockchain network.

BACKGROUND

In this document we use the term 'blockchain' to include all forms of electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions and other information. In the case of Bitcoin, each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Some network nodes act as miners and perform work to ensure that each transaction is valid, with invalid transactions rejected from the network. For example, software clients installed on the nodes perform this validation work on transactions that reference unspent transaction outputs (UTXO).

Validation may be performed by executing its locking and unlocking scripts. If execution of the locking and unlocking scripts evaluate to TRUE and, if certain other conditions are met, the transaction is valid and the transaction may be written to the blockchain. Thus, in order for a transaction to be written to the blockchain, it must be i) validated by a node that receives the transaction—if the transaction is validated, the node relays it to the other nodes in the network; and ii) added to a new block built by a miner; and iii) mined, i.e., added to the public ledger of past transactions. The transaction is considered to be confirmed when a sufficient number of blocks are added to the blockchain to make the transaction practically irreversible.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not purely limited to payments denominated in cryptocurrency. Such solutions would be able to harness the benefits of the blockchain (e.g. a permanent, tamper proof records of events, distributed processing etc.) while being more versatile in their applications.

As blockchain technology is extended to provide new features, it is important that security of the blockchain and the digital assets represented therein be maintained. Extended feature sets that rely on the blockchain can be subject to attack from malicious parties. It can be useful, therefore, to provide methods and devices which offer additional security to the blockchain or new features of the blockchain or which control the ownership over digital assets to maintain the integrity of the blockchain.

Further, as new improvements or modifications to the blockchain are developed, it is helpful to have techniques for controlling the transferring digital assets from one blockchain to another while maintaining the integrity of both blockchains. Thus, it is desirable to provide improved methods and devices which improve blockchain technology in one or more of these aspects.

Thus, in accordance with the present invention there is provided a method as defined in the appended claims.

SUMMARY

As will be described in greater detail below, a congress may be formed on a blockchain network. A congress may be an open-membership group which may be joined by any node in the blockchain network upon submission of sufficient stake to a pool associated with the congress. For example, a node may join a congress through transfer of a digital asset, such as digital currency (such as bitcoin), tokens or other stake or value, to a resource (e.g., an account) associated with the congress. The congress may be secured, in part, through distributed generation of private key shares. Each private key share may be used by its holder to generate a partial signature for a transaction. A threshold signature scheme may be used to generate a valid signature for such a transaction using at least a threshold of partial signatures. The member deposit may be subject to confiscation for malicious behaviour.

Advantageously, through the use of distributed generation of key shares and other security features, key shares may be secured to prevent malicious activity by group members or non-group members. Such security, coupled with the use of a threshold signature scheme, may allow a self-governing, decentralized group to be formed and the group may be used for any one of a number of purposes including, for example, to provide a two-way peg. More particularly, the threshold signature scheme may allow the group to control digital assets encumbered by a public key associated with the group.

Therefore, in accordance with the invention there may be provided a computer-implemented method. The computer-implemented method may include: i) broadcasting, by a node in a blockchain network, a transaction to transfer one or more digital assets to a public group address associated with a congress public key, the public group address being associated with one or more other digital assets associated with other members of a congress; ii) generating a private key share to be used in a threshold signature scheme in which at least a threshold of private key shares must be used to generate a valid signature through the combination of partial signatures on behalf of the congress, and wherein other holders of the private key shares are the other members of the congress who have joined the congress by transfer of respective digital assets to the public group address; iii) using the private key share to cooperatively generate a valid signature for a transaction from the public group address; iv) detecting a request to allocate new key shares; and v) collaborating with other members of the congress to issue private key shares for the same public key to new members of the group.

In some implementations, the threshold signature scheme is an Elliptic Curve Digital Signature Algorithm.

In some implementations, the computer-implemented method may further include: i) detecting malicious activity by a malicious party, wherein the malicious party is one of the other members of the congress; and ii) confiscating at least a portion of digital assets previously transferred to the public group address by the malicious party. In some implementations, confiscating may comprise transferring to an unspendable address and in some implementations, may comprise using the private key share in cooperation with other members of the congress to generate a valid signature for the transaction to the unspendable address.

In some implementations, the computer-implemented method may further include: i) detecting a redistribution request; ii) collaborating with other congress members to transfer all digital assets in the public group address to a new public address associated with a new public key; and iii) generating a new private key share.

In some implementations, the computer-implemented method may further include confirming that a private key share previously used held by a member who has left the congress has been deleted from a node associated with that member. In some implementations, the node associated with a member that has left a congress includes a trusted execution environment which provides attestation of deletion of the private key share previously used held by that member. In some implementations the trusted execution environment of each member may be configured to periodically attest to all transactions that they have partially signed and/or they may be required to broadcast such an attestation before their deposit is reclaimed.

In some implementations, the congress public key encumbers digital assets received from group members and non-group members, and detecting a request to allocate new key shares includes identifying congress members using attributes included in at least some transactions of digital assets to the public group address.

In some implementations, generating the private key share and using the private key share is performed on a trusted execution environment within the node.

In some implementations, the computer-implemented method may further include: i) receiving a request from a requestor who is a congress member for a withdrawal of digital assets previously deposited by the requestor and currently controlled by the congress; ii) evaluating the request against determined criteria; and iii) using the private key share to cooperatively generate a digital signature and using the digital signature to transfer the digital assets previously deposited by the requestor back to the requestor.

In accordance with the invention, there may be provided an electronic device. The electronic device includes an interface device, a processor coupled to the interface device and a memory coupled to the processor. The memory has stored thereon computer executable instructions which, when executed, configure the processor to perform a method described herein.

In accordance with the invention, there may be provided a computer readable storage medium. The computer readable storage medium includes computer-executable instructions which, when executed, configure a processor to perform a method described herein.

In accordance with the invention, there may be provided a computer-implemented method comprising, in a node in a blockchain network: broadcasting, by the node, a transaction to transfer one or more tokens to a public group address associated with a congress public key, the public group address being associated with one or more other tokens associated with other members of a congress; generating, using a secure area of a processor of the node, a private key share, to be used in a threshold signature scheme in which at least a threshold of private key shares must be used to generate a valid signature through the combination of partial signatures on behalf of the congress, and wherein other holders of the private key shares are the other members of the congress who have joined the congress by transfer of respective tokens to the public group address; and using the private key share of the secure area, to cooperatively generate a valid signature for a transaction from the public group address.

In some implementations, the secure area may be a trusted execution environment.

In some implementations, the secure area may store a BGLS private key (which may be a private key associated with an aggregated signature scheme, such as the Boneh, Gentry, Lynn and Shacham "BGLS" scheme (*Aggregate and Verifiably Encrypted Signatures from Bilinear Maps*. International Conference on the Theory and Applications of Cryptographic Techniques, EUROCRYPT 2003: Advances in Cryptology, pages 416-432)) and the method may further include generating, the BGLS private key of the secure area, an enrolment transaction including information corresponding to a most recent block on the blockchain associated with the blockchain network, information corresponding to a most recent block on another blockchain adapted for use as a broadcast channel for communication between the members of the congress and a hash of the initial contents of the memory within the secure area signed using an attestation key of the secure area and bound to the a public key associated with the BGLS private key.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which.

DETAILED DESCRIPTION

Blockchain Network

Figure 1:
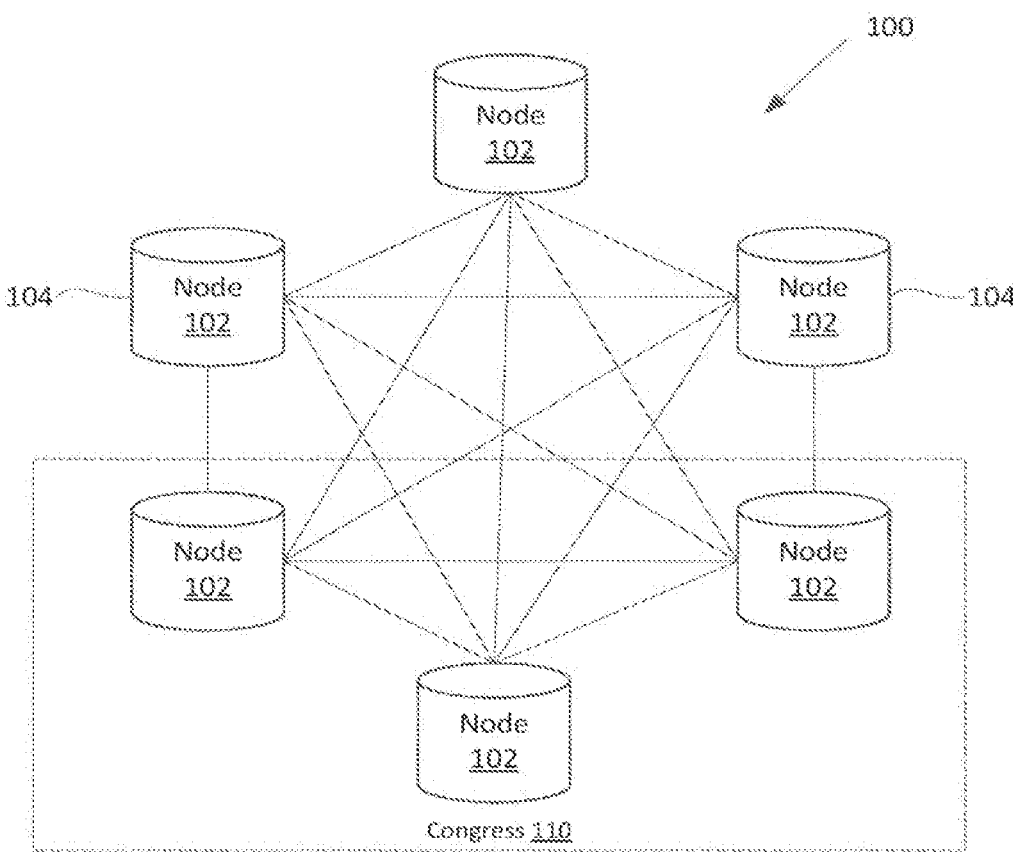
FIG. 1 illustrates a block diagram of an example blockchain network.

Reference will first be made to FIG. 1 which illustrates, in block diagram form, an example blockchain network 100 associated with a blockchain. The blockchain network may be a public blockchain network, which is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, for example.

The electronic devices that run the blockchain protocol and that form the nodes 102 of the blockchain network 100 may be of various types including, for example, computers such as desktop computers, laptop computers, tablet computers, servers, mobile devices such as smartphones, wearable computers such as smart watches or other electronic devices.

Nodes 102 of the blockchain network 100 are coupled to one another using suitable communication technologies which may include wired and wireless communication technologies. Such communication adheres to the protocol associated with the blockchain. For example, where the blockchain is a bitcoin blockchain, the bitcoin protocol may be used.

Nodes 102 maintain a global ledger of all transactions on the blockchain. Thus, the global ledger is a distributed ledger. Each node 102 may store a complete copy or a partial copy of the global ledger. In the case of a blockchain secured by proof-of-work, transactions by a node 102 affecting the global ledger are verified by other nodes 102 so that the validity of the global ledger is maintained. When the blockchain is a proof-of-work based blockchain, blocks are also verified by checking the proof-of-work submitted with the block.

At least some of the nodes 102 operate as miners 104 of the blockchain network 100. The blockchain network 100 of FIG. 1 is a proof-of-work block chain in which miners 104 perform expensive computations in order to facilitate transactions on the blockchain. For example, the proof-of-work blockchain may require miners to solve a cryptographic problem. In Bitcoin the miners 104 find a nonce such that a block header hashes, with SHA-256, to a number that is less than a value defined by the current difficultly. The hashing power required for the proof-of-work algorithm means that a transaction is considered practically irreversible after a certain number of blocks have been mined on top of it. A miner 104 who solves the cryptographic problem creates a new block for the blockchain and broadcasts the new block to other nodes 102. The other nodes 102 verify that the miner 104 has, in fact, solved the cryptographic problem and has, therefore, demonstrated sufficient proof-of-work before accepting that the block should be added to the blockchain. The block is added to the blockchain (i.e., to the distributed global ledger) by consensus of the nodes 102.

The block created by the miner 104 includes transactions which had been broadcast to the block chain by nodes 102. For example, the block may include transactions from an address associated with one of the nodes 102 to an address associated with another of the nodes 102. In this way, the block serves as a record of a transaction from one address to another. The party which requested that the transaction be included in the block proves that they are authorized to initiate the transfer (e.g., in the case of Bitcoin, to spend the Bitcoin) by signing the request using a private key corresponding to their public key. The transfer may only be added to the block if the request is validly signed.

In the case of Bitcoin, there is a one-to-one correspondence between public keys and addresses. That is, each public key is associated with a single address. Thus, any reference herein to transferring digital assets to or from a public key (e.g., paying into the public key) and transferring digital assets to or from the address associated with that public key refer to a common operation.

Some of the nodes 102 may not operate as miners and may instead, participate as validating nodes. Validation of transactions may involve checking signature(s), confirming reference to valid UTXO, etc.

The example of FIG. 1 includes five nodes 102, three of which are participating as miners 104. In practice, the number of nodes 102 or miners 104 may be different. In many blockchain networks, the number of nodes 102 and miners 104 may be much greater than the number illustrated in FIG. 1.

As will be explained below, various nodes 102 may cooperate to form a group which will be referred to herein as a congress 110. In the example illustrated, three nodes 102 are shown as taking part in the congress 110. However, the actual number of congress 110 members may be much larger.

The congress 110 is an open-membership group which may be joined by any nodes 102 upon submission of sufficient stake to a pool associated with the congress 110. For example, a node may join a congress through transfer of a digital asset, such as digital currency (such as bitcoin), tokens or other stake or value, to an account associated with the congress 110. A node 102 joining a congress may be any node in the blockchain network including both mining and non-mining nodes. In at least some applications of a congress (such as when the congress is performing a two-way peg as described below), a node acting as a congress member monitors the blockchain in the sense that they download (but not necessarily retain) the full blockchain.

In various known systems involving groups formed from nodes of a blockchain network, group membership is fixed. For example, "SecureCoin: A Robust Secure and Efficient Protocol for Anonymous Bitcoin Ecosystem" by M. H. Ibrahim published March 2017 in International Journal of Network Security, Vol. 19, No. 2, pages 295-312 provides for coin aggregation and mixing, but membership in the group of nodes exchanging coins is fixed. By contrast, nodes may both join and leave a congress 110. Conveniently, by allowing such flexible group membership, a congress 110 may reduce overhead as compared to systems such as, for example, SecureCoin, by avoiding the need to repeatedly form groups of nodes from scratch.

Techniques for joining, leaving and participating in a congress 110 will be discussed in greater detail below.

Electronic Device Operating as a Node

Figure 2:
FIG. 2 illustrates a block diagram of an example electronic device which may function as a node in a blockchain network.
Figure 2:
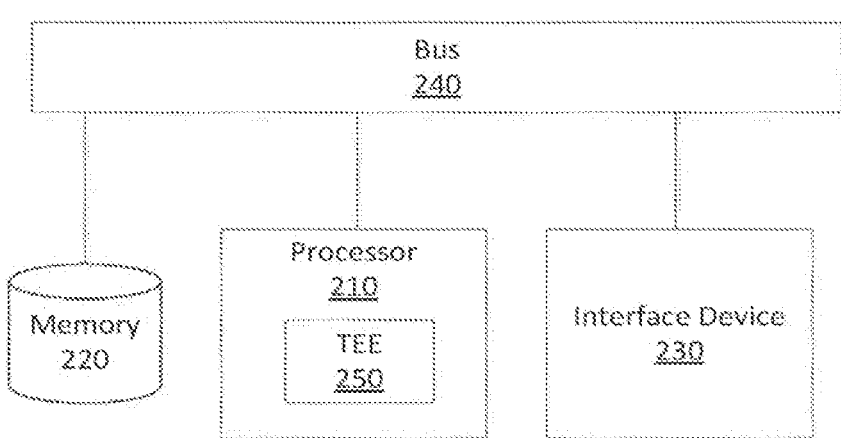

FIG. 2 is a block diagram illustrating components of an example electronic device 200 which may serve as a node 102 (FIG. 1) in a peer-to-peer blockchain network 100 (FIG. 1). The example electronic device 200 may also be referred to as a processing device. The electronic device may take various forms including, for example, a desktop computer, laptop computer, tablet computer, server, mobile device such a smartphone, wearable computer such as a smart watch, or a form of another type.

The electronic device 200 includes a processor 210, a memory 220 and an interface device 230. These components may be coupled directly or indirectly to one another and may communicate with one another. For example, the processor 210, memory 220 and interface device 230 may communicate with each other via a bus 240. The memory 220 stores a computer software program comprising machine-readable instructions and data for performing functions described herein. For example, the memory may include processor-executable instructions which, when executed by the processor 210, cause the electronic device to perform a method described herein. The processor-executable instructions may include instructions which, when executed by the processor 210, cause the electronic device to implement a protocol associated with the blockchain network 100 (FIG. 1). For example, the instructions may include instructions for implementing the Bitcoin protocol.

The memory 220 may store the global ledger of the blockchain network 100 (FIG. 1) or a portion thereof. That is, the memory 220 may store all blocks of the blockchain or a portion of the blocks, such as the most recent blocks, or a portion of the information in some blocks.

While the memory 220 is illustrated with a single block in FIG. 2, in practice the electronic device 200 may include multiple memory components. The memory components may be of various types including, for example, RAM, HDD, SSD, flash drives, etc. Different types of memory may be suited to different purposes. Further, while the memory 220 is illustrated separately from the processor 210, the processor 210 may include embedded memory.

As illustrated in FIG. 2, the processor 210 may include a secure area such as a Trusted Execution Environment (TEE) 250. The TEE 250 is an isolated execution environment which provides additional security to the electronic device 200 such as isolated execution, integrity of Trusted Applications and asset confidentiality. The TEE 250 provides execution space which guarantees that the computer instructions and data loaded inside the TEE 250 are protected in terms of confidentiality and integrity. The TEE 250 may be used to protect the integrity and confidentiality of important resources, such as keys. The TEE 250 is implemented, at least in part, at a hardware level so that instructions and data executed within the TEE 250 are protected against access and manipulation from the rest of the electronic device 200 and from external parties such as the owner of the electronic device. The data and computations within the TEE 250 are secured from the party operating the node 102 that includes the TEE 250.

The TEE 250 may operate to instantiate an enclave and then add pages of memory one at a time, while cumulatively hashing. A similar operation may also be performed on a remote machine (which may be a developer machine or another machine) so that the remote machine determines and stores the hash that is expected. The contents of an enclave can, therefore, be verified by any remote machine to ensure that the enclave is running an approved algorithm. This verification may be performed by comparing hashes. When an enclave is fully built, it is locked down. It is possible to run the code in the TEE 250 and to send secrets to the code, but the code cannot be changed. A final hash may be signed by an attestation key and may be made available to a data owner to verify it before the data owner sends any secrets to the enclave.

The TEE 250 may be used to protect the confidentiality and integrity of a private key share associated with a congress public key used by the congress 110 (FIG. 1). For example, the TEE 250 may be used for the generation and storage of private key shares. The TEE 250 is intended to ensure that no member is able to directly obtain the private key share held within the TEE 250 enclave, or information about other private key shares from inter-member communication or inter-enclave communication. The protocol is also robust against the compromise of a threshold of enclaves. Further, the TEE 250 may enable remote attestation which may be used by a node 102 (FIG. 1) to prove to other nodes 102 that a TEE 250 is authentic and is running approved computer executable instructions for a protocol that is implemented by a congress 110. Remote attestation may be provided by the TEE 250 by running a particular piece of code and sending a hash of the code, internal to the enclave, signed by an internal attestation key for the enclave.

The TEE 250 may be used to attest to secure deletion of the private key share when a member of a congress 110 who has previously used the private key share on the electronic device 200 has chosen to leave the congress. The electronic device 200 may provide attestation of deletion to other congress members through a remote attestation protocol provided in the TEE 250. Attestation of deletion may be required before a member is permitted to withdraw their member deposit. That is, return of the deposit may be conditional on attestation to deletion of the private key share held within the member's enclave.

The TEE 250 may be equipped with a secure random number generator, which is internal to an enclave of the TEE, which can be used to generate private keys, random challenges, or other random data. The TEE 250 may also be configured to read data from external memory and may be configured to write data to the external memory. Such data may be encrypted with a secret key held only inside the enclave.

The TEE 250 may be implemented using various platforms such as Trusted Platform Module (TPM) or Intel Software Guard Extensions (SGX). SGX, for example, supports remote attestation, which enables an enclave to acquire a signed statement from the processor that is executing a particular enclave with a given has of member known as a quote. A third-party attestation service such as Intel Attestation Service (IAS) may certify that these signed statements originate from authentic CPUs conforming to the SGX specification.

The electronic device 200 acts as a node 102 (FIG. 1) in the blockchain network 100 (FIG. 1) and may join and otherwise take part in a congress 110 (FIG. 1). A congress 110 is formed when a group of digital asset bearers pool digital assets, such as digital currency, tokens or other stake or value supported by the blockchain network 100 (FIG. 1).

Congresses and Threshold Signatures

The congress 110 may be a permissioned or non-permissioned group. That is, the congress 110 may be joined by any node 102 (FIG. 1) in the blockchain network 100 (FIG. 1) (i.e., by any node that monitors and stores at least a portion of the information in the blockchain). To join the congress 110, a node 102 transfers one or more digital assets to a digital asset pool associated with the congress 110 (i.e., to a public group address associated with one or more digital assets which are, in turn, associated with other members of the congress). This digital asset pool may be referred to as a congress pool. For example, a node 102 may join a congress 110 by transferring (i.e., depositing) such digital assets to an address associated with the congress pool (i.e., to a "congress address" which may also be referred to as a public group address). The digital assets are placed under the control of a group threshold signature with a single public key, referred to as a congress public key. Congress members hold distributively-generated private key shares. The number of shares held may be in proportion to the amount deposited in the pool.

The digital assets that are controlled by the congress 110, which include any digital assets transferred to the congress address, are placed under the control of a threshold signature scheme. Under the threshold signature scheme, a group of members whose total private key share holdings exceed a threshold are needed to produce a valid signature which allows the digital assets to be transferred away from control of the congress 110. That is, at least a threshold number of private key shares must be used to generate a valid signature for any outgoing transfer of digital assets controlled by the congress 110.

The congress public key encumbers the digital assets deposited in the congress pool by the members of the congress 110 in return for private key shares, and any digital assets deposited to the address associated with the congress pool (i.e., placed under full, partial or conditional control of the congress) by members or non-members of the congress 110 which have been deposited for reasons other than obtaining private key shares. Non-members or members may deposit digital assets to the address associated with the congress for various reasons. In one example which is explained in greater detail below, members or non-members may deposit digital assets to the congress 110 to move such assets to another blockchain, which may be referred to as an alternative chain (alt-chain), such as a sidechain. The sidechain may be a blockchain that runs in parallel to a main blockchain (i.e., parallel to the mainchain).

Since the same congress public key may control both member deposits (i.e., digital assets provided by congress members in return for private key shares) and digital assets provided by members or non-members for other purposes, at least some deposits to the address associated with the congress may be specially flagged to indicate the type of deposit. For example, a transaction that transfers the digital asset to the congress address may include a flag, identifier or other attribute which indicates the nature of the deposit being made. By way of example, a transaction that transfers the digital asset to the congress address that is not made for the purpose of joining a congress or boosting a stake in congress membership may include a special identifier to indicate that the deposit is being made for another purpose. Such identifiers may be used by nodes 102 associated with the congress 110 when managing private key generation.

More particularly, nodes 102 which deposit digital assets for the purpose of joining the group are allocated private key shares for the congress 110 (as a result of making the deposit of digital assets) while other nodes 102 which deposited digital assets for other purposes (e.g., to transfer to a sidechain) may not hold congress private key shares for the congress (i.e., corresponding to the congress public key).

The congress 110 may act as a self-governing group in which cooperative behaviour is enforced through the threat of confiscation of all or part of the member deposit. Non-cooperative or malicious members may have such digital assets confiscated by participation in a cooperative protocol by a number of honest members. That is, to ensure that all nodes 102 operate in conformity with the pre-defined protocol or criteria, member deposits into the congress pool may be subject to confiscation. Confiscation means permanently preventing the return of a member deposit that is deemed confiscated. The digital asset(s) that form the member deposit which are not returned due to the malicious activity may be left in the congress pool but not returned (e.g., if a consensus has been reached (on an alt-chain) that they should not be returned), transferred immediately or in the future to another unspendable address, or otherwise confiscated and the nature of confiscation may depend on whether the congress functions as a bonded validator set for a sidechain.

Further, when a congress member wishes to leave the congress 110, they may withdraw their member deposit (i.e., request that the congress 110 transfer the member deposit back to that member's personal address). However, withdrawal of funds is only performed if a number of private key shares exceeding a threshold required to generate a valid digital signature are used by members of the group (i.e., the congress) to approve the withdrawal.

The threshold signature scheme implemented by the congress 110 may be of various types. The threshold signature scheme allows sharing of signing power between n parties as long as at least a threshold number of private key shares have contributed towards generating a valid signature. Any subset smaller than the threshold cannot generate a valid signature. More particularly, each of the parties controls a share of a private signing key and a threshold number of key shares must be used to generate a valid signature through the combining of partial signatures. Any subset of key shares that is less than the threshold cannot generate a valid signature.

The threshold signature scheme may be an Elliptic Curve Digital Signature Algorithm (ECDSA) scheme. For example, an ECDSA scheme may be of the type proposed by Ibrahim et al. in "A robust threshold elliptic curve digital signature providing a new verifiable secret sharing scheme", 2003 EIII 46th Midwest Symposium on Circuits and Systems 1:276-280 (2003). This threshold signature scheme is an extension of a digital signature scheme which is an elliptic curve cryptography based algorithm in which t+1 key shares from a party of n key share holders are required to reconstruct a private key. The scheme may be used to construct a valid signature without having to reconstruct a private key and without any party having to reveal their key share to another party.

Since t+1 key shares are sufficient to reconstruct the secret, the maximum number of permissible adversaries according to this technique is t. An adversary, in the model of Ibrahim et al., is an entity who has corrupted a party holding a secret share and has access to that secret share. Adversaries can be of various types. For example, a Byzantine adversary is an adversary who may pretend to participate in a protocol while they are, in fact, sending incorrect information. The ECDSA scheme proposed by Ibrahim is robust against up to $t <= n/4$ malicious adversaries. This robustness could rise to $t <= n/3$, but at the cost of greater complexity.

The ECDSA scheme of Ibrahim et al. is robust against halting $t <= n/3$ halting adversaries. A halting adversary is able to prevent a corrupted party from participating in a protocol or halt participation part-way through.

This ECDSA scheme includes various mechanisms which could be used by the nodes 102 to identify a malicious or uncooperative party. For example, verifiable secret sharing (VSS) may be used to share a polynomial required for Shamir's Secret Sharing (SSS). SSS is a form of secret sharing in which a secret is divided into parts and provided to each participant in its own unique part. These parts may be used to reconstruct the secret. VSS may be used, by the nodes 102, to identify a malicious node 102 or member if inconsistent shares are provided to different nodes 102 or if a share is secretly sent to a node that is different than the blinded share which is broadcast to all nodes. Inconsistent shares may be identified by any one of the nodes 102. The sharing of the secret may be made verifiable by including auxiliary information which allows nodes 102 to verify their shares as consistent.

The sending of an incorrect share to an individual node (i.e., a share that is different than the blinded share that is broadcast) can be identified by the intended recipient node of the share.

The identification of an incorrect share being secretly sent to a node can be rendered publicly verifiable using techniques of Publically Verifiable Secret Sharing (PVSS). Such techniques may avoid a possible delay in the identification of a cheating sender which might occur where PVSS is not used and a recipient of an incorrect share is off line or cut off from a substantial fraction of the network when the incorrect share is sent.

Misbehaviour, such as providing inconsistent shares to different nodes, may be addressed by a congress 110 to deter malicious behaviour. For example, when a node 102 (FIG. 1) is identified by other nodes 102 as a malicious party, a number of nodes 102 (i.e., nodes associated with congress members) exceeding a threshold (e.g., t+1) may cooperate to penalize the malicious party. For example, the nodes 102 may take action involving a digital asset (such as digital currency, tokens or other stake or value) deposited to the congress by the malicious party. For example, the congress may bum the digital currency, tokens, stake or value by transferring them to an unspendable address or the congress may confiscate such digital assets by coming to a consensus with other nodes to refuse. The nodes 102 that are not a misbehaving node may also deter misbehaviour by cooperating to exclude a misbehaving node (e.g., by effectively invalidating key shares; for example, by excluding a node from participating in the congress protocol, or by re-sharing the private key and not allocating the misbehaving node a share).

The ECDSA technique described above may be enhanced through the use of a TEE. For example, the threshold ECDSA signature technique based on Ibrahim et al. contemplates a strong form of adversary, referred to here as a Byzantine adversary. This type of adversary may behave arbitrarily, for example, they not only refuse to participate in the signing process or halt party way through, but may also pretend to honestly participate and send incorrect information. However, by using TEEs, and producing the data used for signing within an enclave of a TEE where a secret private key share is stored, additional security may be provided since it is highly unlikely that enclaves could be compromised in significant numbers. If each TEE is allocated no more than one key share, for example, the number of possible compromised TEEs could reasonably be expected to not approach the threshold for robustness against Byzantine adversaries, assuming n to be sufficiently large. This allows the protocol to be secure if it is tolerant to a small proportion of malicious adversaries relative to the total number of key shares.

For example, if all nodes have TEEs, acquisition of a secret stored within an enclave could only be achieved with physical access to a node and only at great effort and expense, provided the manufacturer of the TEE is not corrupted. Such manufacturer-level corruption is expected to be manageable. For example, if a manufacturer were to falsely claim that a number of public keys correspond to genuine TEEs, they could gain direct access to private key shares and potentially launch an attack. However, such an attack would require a sufficient number of key shares to allow the manufacturer to produce a valid signature without assistance from other nodes. This would mean accumulating a large portion of the total stake, which would be quite expensive. Moreover, by carrying out the attack, a large percentage of the value of the stake holding would be destroyed.

When TEEs are used, it is useful to contemplate the robustness of the protocol to "corrupted nodes". A corrupted node is a node such that the hardware external to the TEE is corrupted, but the integrity of the TEE is not compromised. A corrupted node may have control over what information the enclave receives and does not receive. In particular, a corrupted node may halt i.e., refrain from participation in the protocol. If information provided to the protocol is required to be signed by a private key held secretly in the enclave (where the corresponding public key was authenticated during attestation) the private key is as trustworthy as the enclave itself.

Hence, a corrupted node cannot send arbitrary (authenticated) information to the protocol, and may only attempt to interfere by halting or attempting to fool the enclave into acting improperly, for example, by providing it with outdated information. It follows that, for corrupted nodes, a successful attack would require gathering of a sufficient number of partial signatures to produce a full signature. With TEEs, the protocol of Ibrahim et al. is robust against 2t corrupted nodes. Because a signature can be produced if $n-2t >= 2t+1$, any qualified subset of key shares of size $2t+1 <= (n+1)/2$ is sufficient. Accordingly, when TEEs are used, a threshold for the threshold signature scheme may be configured to be a number that is greater than or equal to 50% of the key shares to produce a valid signature in the presence of corrupted nodes.

Other threshold signature schemes may also be used. For example, the threshold signature scheme may be an ECDSA threshold scheme of the type proposed by Goldfeder et al., "Securing Bitcoin Wallets Via a New DSAZECDSA threshold signature scheme", (2015). This protocol allows t+1 parties to produce a valid signature. Consequently, the number of key shares an adversary has to control to produce a valid signature is equal to the number of key shares an adversary has to possess to reconstruct the private key. This technique can provide an efficient scheme in the case in which unanimity is required to produce a valid signature. In the most general case, this scheme imposes space requirements that scale exponentially with the number of congress members since, for an arbitrary threshold one needs to repeat the whole protocol for any possible subset of t+1 players out of n. Thus, for large values of both n and /, a large number of key shares will need to be stored. To mitigate such storage requirements, standard bitcoin multi-signatures could be combined with threshold signatures. In particular, digital assets could be locked using multi signature so that each private key is divided into shares. This technique would make larger congresses more efficient in terms of space requirements. Scaling properties may also be improved by composing a scheme for a large number of participants out of smaller party sizes, at multiple levels, in an iterative fashion. For example, the threshold signature scheme could be combined with techniques of Cohen, et al., *Efficient Multiparty Protocols via Log-Depth Threshold Formulae* (2013), Advances in Cryptology-CRYPTO 2013, pages 185-202.

Other threshold schemes may be used including non-ECDSA signature schemes. For example, a threshold scheme based on a Schnorr scheme may be used by the nodes 102 to implement the congress 110.

Nodes 102 (FIG. 1) in the blockchain network 100 (FIG. 1) may implement a congress protocol based on the selected threshold signature scheme. Such nodes 102 may include computer-executable instructions stored in memory 220 (FIG. 2) which implement the congress protocol. Such instructions, when executed by a processor 210 (FIG. 2), cause a node 102 (such as an electronic device 200 of the type described with reference to FIG. 2) to perform one or more methods of the congress protocol. Such methods may include any one or combination of the methods 300, 400, 500, 600, 700, 800, 1000 of FIGS. 4 to 8 and 10. Thus, the congress protocol may include one or more of the methods 300, 400, 500, 600, 700, 800, 1000 of FIGS. 4 to 8 and 10. The methods may be performed by a node cooperatively with other nodes associated with other congress members.

Congress Initiation

Figure 3:
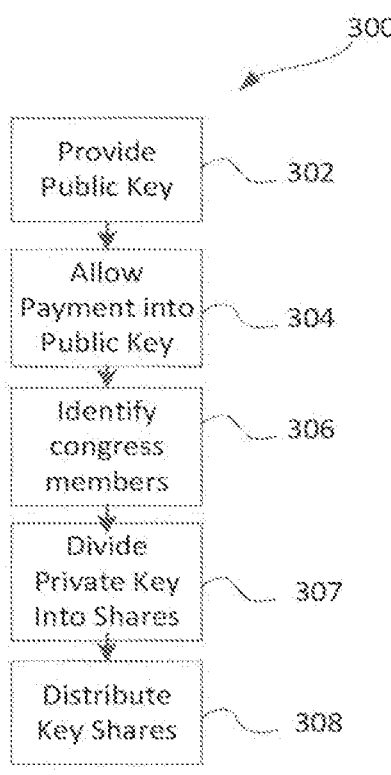
FIG. 3 is a flowchart of an example method of initiating a congress.

Referring now to FIG. 3, a method 300 of initiating a congress 110 is illustrated. The method 300 may be performed by an initially trusted party to set up the congress 110. That is a node 102 associated with the initially trusted party may perform the method 300.

The method 300 includes, at operation 302, providing a congress public key. The congress public key may be provided to other nodes 102 to allow the other nodes to pay into the congress public key if they wish to join the congress. That is, others may transfer digital assets to an address associated with the congress public key in order to join the congress.

The node 102 performing the method 300, at operation 304, allows payment into the public key until one or more conditions are satisfied. For example, the node may allow payment into the public key for a determined period of time or for a determined number of blocks. After the condition is satisfied (e.g., after expiration of this period of time or mining of the number of blocks), the node 102 performing the method 300 identifies, at operation 306, initial members of the congress.

After the parties who will comprise the initial membership of the congress are identified, a private key is divided into private key shares according to a threshold signature scheme at operation 307. The private key shares are then distributed, at operation 308, from the node 102 performing the method 300 to the identified parties. The private key shares are associated with a threshold signature scheme, which may be of the type described herein.

During operation 308, the nodes 102 that are identified as congress members cooperate to generate new private key shares and a new public key. The original key shares that were sent to such nodes by the initially trusted party may be used to sign and broadcast a transaction to send all digital assets in the congress pool to the new public key, which then becomes the congress public key. That is, during operation 308, a new group public address is established and the digital assets under control of the congress are transferred to this new address, which becomes the new address for the group and which is associated with the congress public key. After this transfer is confirmed, the congress can operate trustlessly. The new group public address is formed into which deposits of digital assets may be received in the future from other nodes wishing to join the congress 110, or for other purposes as described above. The congress members are now considered to be enrolled in the congress and these nodes can now operate without the aid of the initially trusted party. Moreover, the initially trusted party no longer plays any part in the operation of the congress.

Joining a Congress after the Congress has been Initiated

Figure 4:
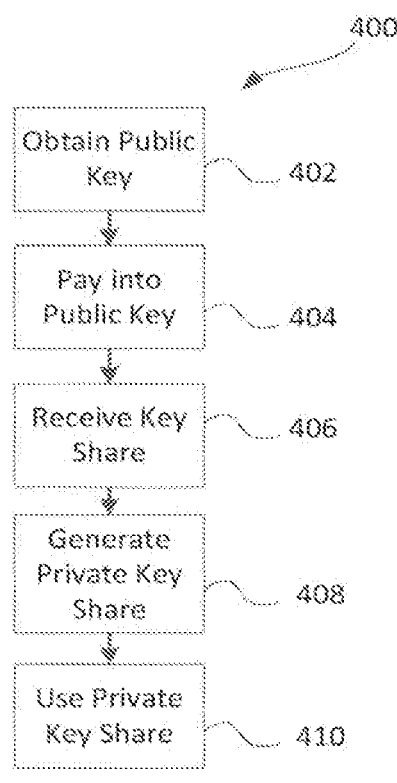
FIG. 4 is a flowchart of an example method of joining a congress.

Reference will now be made to FIG. 4 which illustrates a method 400 of joining a congress. The method 400 of FIG. 4 may operate in conjunction with the method 300 of FIG. 3, but the method 400 of FIG. 4 is performed by a different one of the nodes 102 operating in the same blockchain network 100 (FIG. 1) in which the node performing the method 300 of FIG. 3 operates. The method 400 of FIG. 4 includes, at operation 402, obtaining a congress public key. The congress public key may be obtained directly from the party initiating the congress, such as the node performing the method 300 of FIG. 3, or it may be obtained from a third party including, for example, a third party system operating outside of the blockchain network 100 (FIG. 1). For example, the congress public key may be obtained from a public web server accessible over the public Internet.

The node 102 performing the method 400 pays into the congress public key at operation 404 by broadcasting a transaction of digital assets from a private account associated with the node 102 to a congress address (i.e., an address associated with the congress public key). More particularly, the node 102 broadcasts a transaction to transfer one or more digital assets to a public group address that is associated with the congress public key. The public group address is the address for a congress pool. The congress pool includes other digital assets associated with the other members of a congress. Thus, the transaction at operation 404, once added to a block by a miner 104 (FIG. 1), transfers the digital asset to the congress pool which includes digital assets from other members. The public group address may receive both transfers from parties wishing to join the congress and transfers from parties not wishing to join the congress. The parties who do not wish to join the congress transfer the digital assets to the congress pool so that such digital assets may be placed under total, partial or conditional control by the congress using a threshold signature scheme employed by the congress.

The transaction at operation 404 may include a flag, identifier or other attribute which indicates that the party transferring the digital asset wishes to join the congress and that the deposit is being made for such purpose.

After depositing the digital assets with the congress pool, the node 102 performing the method 400 receives, at operation 406, a private key share. Then, the node 102 regenerates the private key share at operation 408 by running a single instance of the protocol. The generation of a private key share may be performed within a TEE of the node 102.

At operation 408, the node 102 generates a private key share that is to be used in a threshold signature scheme in which at least a threshold of private key shares must be used to generate a valid signature for a transaction on behalf of the congress. Other holders of private key shares are the other members of the congress who have joined the congress on a permissioned or non-permissioned basis by transfer of respective digital assets to the public group address.

To regenerate the private key shares, at operation 408, the existing congress members may cooperate to update the key shares. For example, a node 102 may generate a random polynomial of order t and with the constant term zero/$n_+i(x)$. The node 102 may then calculate the point $fn+itj^1+1)$ and set this as their private key share. The node 102 may then distribute the points on this polynomial/$n_+i(i)$ to each of the existing congress members, i=1, Each existing congress member (i=1, then adds the received value to their existing private key share to obtain the new private key share. The node 102 now has a private key share equivalent to all other members and the corresponding public key remains unchanged. As described above, the threshold signature scheme may be of various types including an Elliptic Curve Digital Signature Algorithm or a threshold scheme based on a Schnorr scheme.

The private key share may be generated within a TEE 250 (FIG. 2) and may be securely stored on the node 102. For example, the private key share may be stored in the TEE 250.

After the private key share is generated by respective nodes, funds under control of the previous congress public key (e.g., funds transferred to the public group address that is associated with the original congress public key) may be transferred (through cooperation of a number of group nodes sufficient to generate a valid signature under the threshold signature scheme) to a new congress public key associated with the new private key shares.

After the private key share is generated at operation 408, it may be used at operation 410 of the method 400. The private key share may be used to cooperatively generate a valid signature for a transaction from the public group address which may be broadcast by a member. That is, the private key share may be used in the threshold signature scheme to contribute towards signature generation. Under the threshold signature scheme, a threshold number of private key shares of the congress are required to be used by respective members to produce a valid signature which allows the digital assets to be transferred away from the congress. The node 102 performing the method 400 may retrieve the private key share from storage and use the private key share in order to contribute towards signature generation. If a sufficient number of other congress members also use their respective private key to contribute towards signature generation, the signature is generated and a valid outgoing transaction may be broadcast. When a miner 104

(FIG. 1) of the blockchain network 100 adds the transaction to a mined block which is added to the blockchain by consensus of the nodes 102 in the blockchain network 100 and the block is confirmed, the outgoing transaction is complete. At this point, the digital assets represented in the transaction may no longer be under the control of the congress. That is, such digital assets may no longer be encumbered by the congress public key.

The use of the private key share at operation 408 may be performed within a TEE of the node 102. The TEE protects the private key share such that other parts of the system nor the member themselves cannot access any data stored in an enclave, such as the private key share. Further, the TEE protects the private key in that it cannot retain a copy of the private key if the member wants their deposit back and receive their deposit back since it must attest to the deletion of the private key before the member deposit is returned.

The method 400 of FIG. 4 may be performed during or after the initial setup phase. That is, the method 400 may be performed before the initial key shares are distributed (e.g., during operation 308 of the method 300 of FIG. 3) or afterward (e.g., during rebalancing, which will be discussed in greater detail below).

The transaction at operation 410 may transfer the digital asset back to the party which originally deposited those digital assets to the congress pool. That is, the transfer may return digital assets to a depositor. The transfer may also transfer the digital asset elsewhere. For example, the digital asset may be transferred to a third party or to an unspendable address.

Confiscation of Digital Asset

Figure 5:
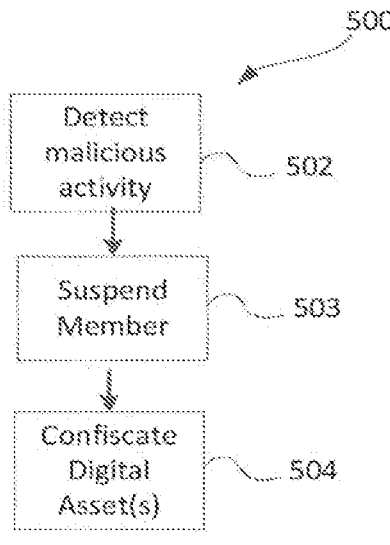
FIG. 5 is a flowchart of an example method of confiscating a digital asset.

Referring now to FIG. 5, an example method 500 of confiscating a digital asset is illustrated. The method 500 of FIG. 5 may be performed by a node 102, which may be the same node performing the method 400 of FIG. 4. The method 500 may be performed after operation 408 of the method 400 of FIG. 4 so that the node 102 already has access to a private key share when the method 500 of FIG. 5 is performed.

At operation 502, the node 102 detects malicious activity by a malicious party. The malicious party may be another member of the congress. Malicious activity is detected when the node 102 determines that a member of the congress is in breach of a pre-defined protocol or criteria. For example, when a node which is a member in the congress reports faulty information (i.e., false, inconsistent or otherwise unacceptable information) to other members of the congress, the member may be deemed to be a malicious member.

At operation 503, in response to detecting malicious activity, the node 102, in cooperation with other nodes in the congress, may suspend the member that is the malicious party. That is, the congress may exclude the malicious party from further participation in the congress.

To ensure that all nodes 102 operate in conformity with the pre-defined protocol or criteria, member deposits into the congress pool may be subject to confiscation. Confiscation means permanently preventing the return of a member deposit that is deemed confiscated. The digital asset(s) that form the member deposit which are not returned due to the malicious activity may be left in the congress pool but not returned (in response to a consensus that that this action should be taken), transferred immediately or in the future to another unspendable address, or otherwise confiscated and the nature of confiscation may depend on whether the congress functions as a bonded validator set for a sidechain. For example, at operation 504, in response to detecting malicious activity by a malicious party, the node 102 performing the method 500 may use the private key share to provide a partial signature on a confiscation transaction (which is a transaction that transfers digital assets to an unspendable address or to another node as a reward for exposing malicious activity). That is, the node cooperates with other nodes of the congress to confiscate at least a portion of the digital assets that were previously transferred to the public group address (i.e., to the congress pool) by the malicious party. That is, in response to observing that the group member is in breach of the pre-defined protocol or criteria, the private key share is utilized to contribute to the authorization of a transaction of one or more digital assets that are associated with that group member and that are held in the congress pool.

Since a threshold signature scheme is used with the congress public key, an individual node acting alone cannot transfer another congress member's deposit of digital assets away from the congress pool (e.g., to an unspendable address). Rather, the digital assets can only be confiscated by transfer when a threshold number of private key shares are used by their respective members to generate a valid signature to transfer the digital asset(s) to another address or when a group of members having at least a threshold number of private key shares reach consensus to suspend a member (at operation 503), which causes any withdrawal request from the suspended member to be automatically ignored. When digital assets are confiscated by transfer, the other address to which the digital asset(s) may be transferred may be associated with an unspendable address. For example, the other address may be an address for which no private key exists so that no party can access the digital assets bound by the public key for the address. When a transaction that transfers digital assets to the unspendable address is confirmed or when consensus is reached on a sidechain that digital assets should be confiscated, the digital assets may be considered to have been burned, since they are no longer spendable by any members of the congress or indeed by any nodes in the blockchain network 100.

Accordingly, at operation 504, the node may confiscate the digital asset by using the private key share in cooperation with other members of the congress to generate a valid signature for the transaction to the unspendable address and in some implementations may involve achieving consensus, on a second blockchain, that a member should be permanently deprived of all or part of their deposit.

Further, in some implementations, a congress may serve as a bonded validator set, securing a proof-of-stake sidechain, and this sidechain may be used as a broadcast channel. For example, a consensus may be reached by the congress members on the sidechain that a member has acted maliciously. This consensus could correspond to confirmation of a sidechain transaction containing incriminating evidence of the malicious activity. When consensus is reached, any request to withdraw a member deposit, made by the malicious member, will be denied and the deposit is considered to be confiscated. The confiscated digital assets may be burnt at some time in the future. That is, at some time later, a threshold of members (not including the malicious member) may collaborate to authorize transfer of the confiscated digital assets to an unspendable address.

Figure 6:
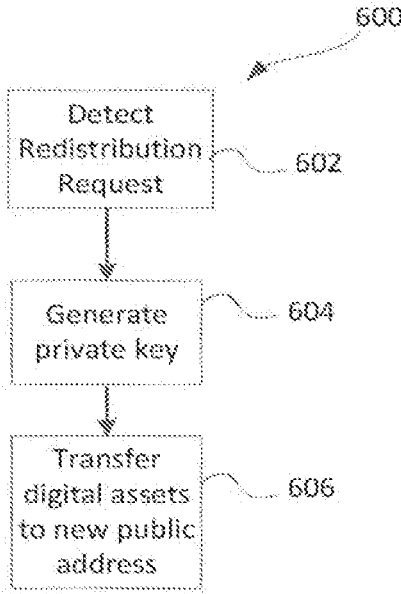
FIG. 6 is a flowchart of an example method of redistributing key shares.

Since the congress is an open group which may be joined by any node 102 of the blockchain network 100 through deposit of digital assets, the group membership may periodically change. When such changes occur, the private key share distributions may be updated. Referring now to FIG. 6, an example method 600 of updating private key share distributions is illustrated. The method 600 may be performed by a node 102 of the blockchain network 100 in cooperation with other nodes of the blockchain network 100.

Updating Private Key Share Distributions Using New Public Address

At operation 602 of the method 600, the node 102 detects a redistribution request, which is a request, the fulfilment of which entails a redistribution of key shares. For example, the node 102 may detect that a prospective new member has transferred digital assets into the public group address or that an existing member has requested withdrawal of a member deposit Digital assets may be transferred to the public group address by nodes requesting to join the congress or increase their participation in the congress and by other nodes who are not requesting to join the congress but are instead transferring the digital assets to the congress for another purpose (such as to transfer the digital assets to a sidechain, as will be described below). At operation 602, the node 102 may identify congress members (i.e., the parties that transferred digital assets to the congress public key to join the congress and not for another purpose) using one or more attributes included in at least some of the transactions of digital assets to the public group address. For example, certain transactions may be flagged as special transactions using an attribute in the transactions. Such attributes (or the presence or absence thereof) may indicate a purpose for which the transfer is made. For example, a flag may be included in a transaction when the transferor is not requesting to join the congress.

In response to detecting the request at operation 602, the fulfillment of which, entails the redistribution of key shares, at operation 604, a new private key share is generated by the node 102 in a manner similar to the manner that the private key share was generated at operation 408 of the method 400 of FIG. 4. Other member nodes of the congress also generate respective private key shares. These private key shares may be used with the threshold signature scheme for the new congress public key. Members who will leave the congress at this point do not generate new private key shares during operation 604 and, since they will not be allocated a private key share for use with the new congress public key, they lose the capacity to take part in the congress and are no longer considered congress members.

Further, in response to detecting a redistribution request (which is a request, the fulfilment of which, entails the redistribution of key shares), at operation 606, the node 102 collaborates with other congress members to transfer all digital assets in the public group address to a new public address associated with a new public key (which will then become the new congress public key).

Thus, according to the method 600 of FIG. 6, when the distribution of deposits changes or when a request is received from a member to withdraw a deposit, private key shares may be regenerated and all of the digital assets under control of the congress may be moved to a new public key. The frequency with which memberships of a congress can be updated is limited by the block time of the blockchain network 100. Many applications may only require rebalancing at low frequencies.

Figure 7:
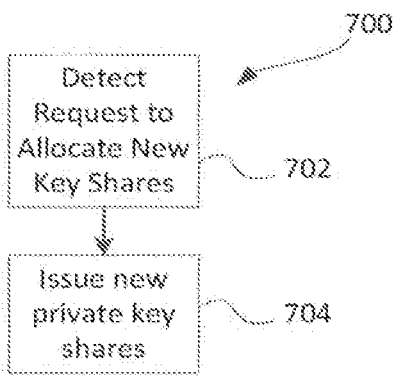
FIG. 7 is a flowchart of a further example method of redistributing key shares.

Updating Private Key Share Distributions while Retaining Existing Public Group Address Referring now to FIG. 7, a further example method 700 of updating private key share distributions is illustrated. The method 700 may be performed by a node 102 of the blockchain network 100 in cooperation with other nodes of the blockchain network 100.

In the method 700 of FIG. 7, the congress public key does not change each time the distribution of member deposits changes. When a request to allocate a new key share is detected (at operation 702, which may occur through deposit of digital assets to the public group address), the node 102 collaborates with other members of the congress to issue (at operation 704) new private key shares for the same public key to the new members of the group. The number of nodes that collaborate is at least the threshold number of nodes required to generate a digital signature under the threshold signature scheme. At operation 704, an additional key share may be allocated while other key shares remain the same. This may entail a change in threshold (of the threshold signature scheme), although the change may in practice be small. Alternatively, at operation 704, an additional key share may be allocated while other key shares are renewed. Such renewal is required to be accompanied by the attestation to deletion of any key shares of the previous generation. In this case, new shares may be allocated while maintaining the same threshold (in the context of SSS, this involves sharing on a new polynomial, of increased order).

At operation 702, the node 102 may identify congress members (i.e., the parties that transferred digital assets to the congress public key to join the congress and not for another purpose) using one or more attributes included in at least some of the transactions of digital assets to the public group address. For example, certain transactions may be flagged as special transactions using an attribute in the transactions. Such attributes (or the presence or absence thereof) may indicate a purpose for which the transfer is made. For example, a flag may be included in a transaction when the transferor is not requesting to join the congress.

When members leave a congress which uses the method 700, they may securely delete their private key share. In order to ensure that private key shares of old members are unusable, the members of the congress may be required to use nodes 102 having a special TEE. The TEE is an architecture implemented at the hardware level which guarantees that instructions and data executed within them are protected against access and manipulation from the rest of the system. The TEE may employ hardware mechanisms to respond to remote attestation challenges which can be used to validate the system's integrity to an external party, such as the other nodes in the congress.

Each member node may use a certified TEE configured to generate one or more random secret values which remains inaccessible to the host system without compromising the hardware at the integrated circuit level. Secret values generated in this way would be used in distributed generation of private key shares (e.g., at operation 410 of the method 400 of FIG. 4). This secret value could also be used to establish the shared public key in the set up phase of the congress. Computations associated with the set up protocol are performed within the TEE enclaves so that no member or former member can derive any information about their own or others private key shares from inter-member communication or any other method. The enclaves within the TEEs enable a remote attestation protocol to be performed which may be used to prove to other nodes that the TEE enclave is authentic and that it is running approved computer-readable instructions.

Computations associated with group changes are performed within the TEE enclave. For example, the generation of a new secure random secret that may be used in calculating a new polynomial for the purposes of SSS is performed in the TEE enclave.

The TEE enclave also aims to ensure that previous key shares and previous secrets that are no longer to be used are securely deleted before a member deposit can be returned. More particularly, in order to have a member deposit returned, an attestation protocol may require that the TEE enclave attests to the deletion of a key share. Each node 102 may interpret such an attestation as a confirmation that the required deletion has occurred on other nodes through the remote attestation protocol. Thus, the method 700 may also include confirming that a private key share previously held within the TEE of a member who has left the congress has been deleted from a node associated with that member. This confirmation may be performed by receiving attestation of deletion of the private key share. Accordingly, the remote attestation protocol may be used to obtain attestation to the deletion of the private key share previously held in the TEE of a member who has left the congress.

The method 600 of FIG. 6 and the method 700 of FIG. 7 each offer various benefits. For example, the method 600 of FIG. 6 does not rely on secure deletion and does not need to rely on trusted hardware. However, the method 600 of FIG. 6 could benefit from such hardware since, in some circumstances, such hardware may make the malicious pooling of key shares more unlikely.

The method 700 of FIG. 7 avoids having to relock digital assets under a new congress public key each time the membership changes. For example, implementations of method 700 employing a TEE, may allow a persistent group address may be employed in which group members may come and go without compromising security. Conveniently, in this way, the overhead of having to change group addresses may be avoided while still providing adequate security. Further, in some circumstances the method 700 may update membership faster than the method 600 of FIG. 6 since, under the method 700 of FIG. 7 a transaction does not need to be added to the blockchain to move all digital assets to a new public key because digital assets are not moved to a new public key. That is, the membership may be updated using the method 700 of FIG. 7 without having to wait for several blocks to be generated to confirm transfer of the digital assets to the new public key since the public key does not change.

Disenrollment from Congress

Figure 8:
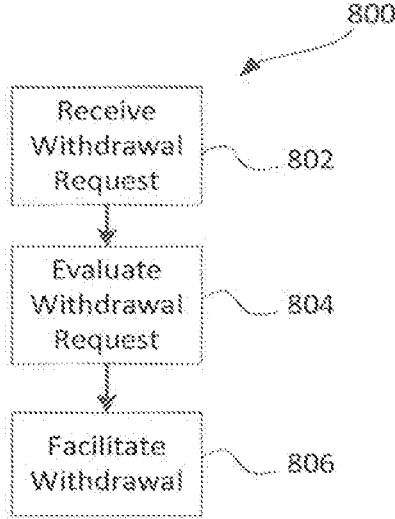
FIG. 8 is a flowchart of an example method of returning a deposit.

As noted above, group members may occasionally request to leave the congress and, when a group member disenrolls from a congress, the digital assets that they deposited to the congress pool may be returned to them. Referring now to FIG. 8, an example method 800 of returning a deposit is illustrated in flowchart form. The method may be performed by a node 102 in cooperation with other nodes 102 of the congress.

At operation 802 of the method 800, the node 102 receives a withdrawal request from a requestor who is a congress member. The withdrawal request may also be referred to as a disenrollment request. The withdrawal request is a request to withdraw digital assets previously deposited by the requestor and currently controlled by the congress. The request may have been broadcast, by the requestor to all congress members.

In response to receiving the request, the node 102, at operation 804, evaluates the request against determined criteria. Such criteria may be predetermined criteria. If the congress operates according to a congress protocol in which the congress public key is not changed each time group membership changes, then at operation 804, the node 102 may confirm that a private key share has been deleted by the requestor. Such confirmation may be obtained using a remote attestation protocol associated with a TEE.

If the congress protocol is one in which the congress public key is changed when membership changes, the node 102 may not confirm deletion of the private key share since the private key share is no longer effective. Instead, a new congress key may be used and other digital assets under congress control may be transferred to the new congress key.

If the node 102 approves the withdrawal request based on the evaluation, at operation 806 the node facilitates withdrawal of the digital assets. That is, the node 102 uses its private key share to cooperatively generate a digital signature and uses the digital signature to transfer the digital assets previously deposited by the requestor back to the requestor. For example, the digital assets may be sent back to the address from which they were previously received. Operation 806 is performed in accordance with the threshold signature scheme so that the withdrawal is only effected if at least the threshold number of congress members authorize the withdrawal. Operation 806 is performed after the member who desires to disenroll is suspended from activity for a period of time. This waiting period prevents the member from engaging in misbehaviour while the protocol for return of their member deposit is being performed.

The congress protocol may be used for a number of different purposes. The congress provides a secure mechanism for performing various functions. The congress may operate trustlessly and provides control of ownership over a digital asset.

The congress protocol may for example, be used to implement a two-way peg between a secured permissionless proof-of-work blockchain and a secured permissionless proof-of stake blockchain. A two-way peg is a mechanism that allows the effective transfer of digital assets from one blockchain to another blockchain and back again. More particularly, digital tokens may be transferred from a main blockchain network, which may be referred to as a mainchain, to a separate, secondary blockchain network, which may be referred to a sidechain or alt-chain. The mainchain need not be a specially-configured mainchain. Indeed, the techniques described below will operate with existing protocols on a mainchain (such as Bitcoin). The techniques will operate with any mainchain which authorizes a transfer of digital assets using digital signatures. As will be described in greater detail below, the transfer from a mainchain may be achieved by the temporary locking of the digital assets on the mainchain accompanied by a miner of the sidechain minting corresponding digital assets on the sidechain. A transfer from the sidechain to the mainchain may also be performed by burning digital assets on the sidechain when there is a mechanism by which this act results in the unlocking of an equivalent quantity of digital assets on the mainchain.

System with Multiple Blockchain Networks

Figure 9:
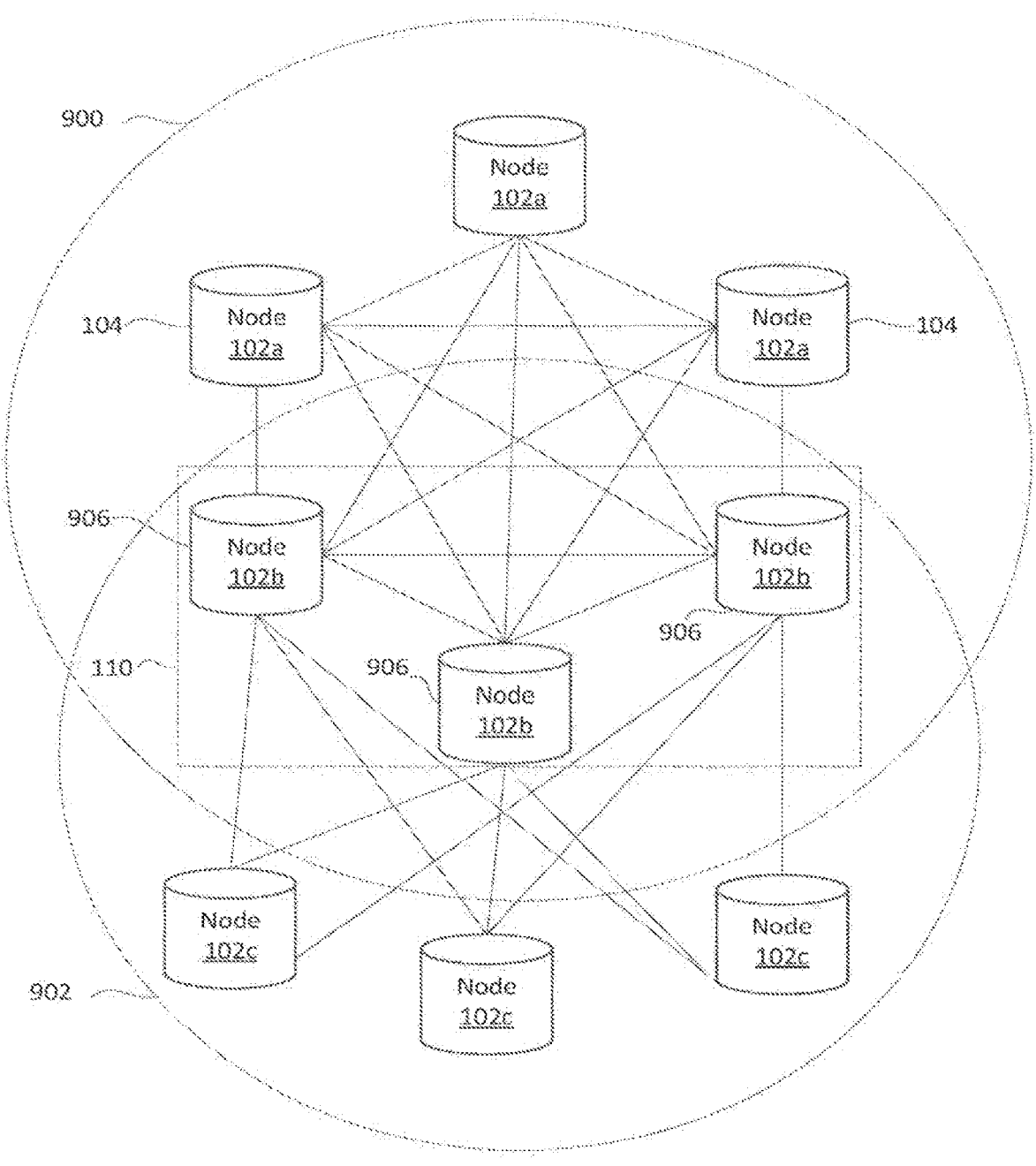
FIG. 9 is a block diagram of first and second blockchain networks.

Referring now to FIG. 9, a block diagram of example first and second blockchain networks is illustrated. A first blockchain network 900 is a proof-of-work blockchain network. The first blockchain network 900 may be of the type described above with reference to FIG. 1. The first blockchain network 900 includes a number of nodes 102*a*, 102*b* which are coupled to one another using suitable communication technologies which may include wired and wireless communication technologies.

The nodes 102*a*, 102*b* of the first blockchain network 900 maintain a global ledger of all transactions on a first blockchain (which may be referred to as the mainchain). At least some of the nodes 102*a*, 102*b* operate as miners 104 of the first blockchain network 900.

A second blockchain network 902 is a proof-of-stake blockchain network. The second blockchain network 902 includes a plurality of nodes 102*c*, 102*b* which are coupled to one another and which maintain a global ledger for the second blockchain network 902. The global ledger for the second blockchain network 902 is separate and distinct from the global ledger of the first blockchain network 900. The global ledger for the second blockchain network 902 may be referred to as a sidechain.

The proof-of-stake based second blockchain network 902 provides an alternative mechanism for achieving consensus. In the proof-of-stake blockchain network, the blockchain is secured by proof-of-stake rather than proof-of-work. Under proof-of-stake, the miners 906 deposit a security deposit of digital assets and, the probability of being selected as the node to mine a block is proportional to the quantity of the digital assets provided as a security deposit. Proof-of-stake blockchain systems can be used to avoid the computational expense and energy required to mine on proof-of-work blockchains. Further, proof-of-stake blockchains can allow for higher frequency and more regular block creation than proof-of-work blockchains.

The second blockchain network 902 also includes a number of nodes 102*b*, 102*c* which are coupled together using suitable communication technologies. These nodes 102*b*, 102*c* maintain the global ledger for the second blockchain network 902.

A plurality of nodes 102*b* function as miners 906 of the second blockchain network 902. Since the second blockchain network 902 is a proof-of-stake blockchain network, the miners 906 deposit digital assets in order to be included as miners. More particularly, the miners 906 for the sidechain form a bonded validator set in order to mine on the second blockchain network 902. These miners 906 are also members of a congress 110 associated with the first blockchain network 900. That is, nodes 102*b* which are part of both the first blockchain network 900 and the second blockchain network 902 act as miners 906 for the second blockchain network 902 and as members of a congress 110 established on the first blockchain network 900. These miners 906 join the congress 110 and take part in the congress 110 according to methods described above. Their deposit of digital assets into a congress pool is made in the mainchain. That is, the congress members deposit their "stake" on the proof-of-work first blockchain network 900 to become congress members for the first blockchain network 900 and also act as miners 906 on the second blockchain network 902 by forming a bonded validator set. The member deposits on the first blockchain network 900 serve as security deposits for the second blockchain network 902.

Also, since the quantity of private keys shares that a member holds is based on the amount of that member's security deposit and since such deposits are subject to confiscation for malicious behaviour, members having a greater influence on congress activity (i.e., members holding more private key shares) have more to lose than less influential members. The congress 110 is an open-membership group which may be joined by any nodes upon submission of sufficient stake to a pool associated with the congress 110. Since the congress members are miners on the second blockchain network 902, they can create new digital assets on the second blockchain network 902 to effectively transfer digital assets from the first blockchain network 900 to the second blockchain network 902. The congress 110 may be used to provide a two-way peg between the proof-of-work and proof-of-stake blockchains.

The nodes 102a, 102b, 102c illustrated in FIG. 9 may be electronic devices 200 of the type described above with reference to FIG. 2.

Two-Way Peg

Figure 10:
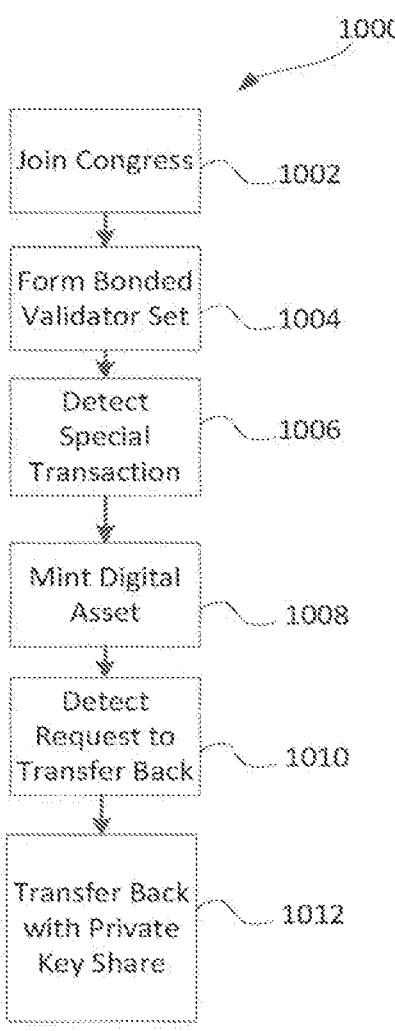
FIG. 10 is a flowchart of an example method for providing a two-way peg.

Reference will now be made to FIG. 10 which illustrates, in flowchart form, at example, method 1000 of providing a two-way-peg. The method 1000 may be performed by a node 102b which operates in both the first blockchain network 900 (i.e., in the proof-of-work blockchain network) and the second blockchain network 902 (i.e., in the proof-of-stake blockchain network). Computer-readable instructions may be stored in a memory of such a node and these instructions, when executed by a processor of the node, configure the processor to perform the method 1000.

At operation 1002, the node 102b joins a congress. The congress may be joined in the manner described above with reference to FIG. 4. For example, the node 102b may transfer one or more digital assets to a public group address associated with a congress public key. The public group address has one or more other digital assets associated with other members of a congress (e.g., other nodes 102b). When the node 102b joins the congress, the node 102b generates a private key share for use in a threshold signature scheme in which at least a threshold of private key shares must be used to generate a valid signature on behalf of the congress. As described above, the threshold signature scheme may be of various types including an Elliptic Curve Digital Signature Algorithm or a threshold scheme based on a Schnorr scheme.

Other holders of the private key shares are the other members of the congress who have joined the congress on a permissioned or non-permissioned basis by transfer of respective digital assets to the public group address.

At operation 1004, the node 102b that joined the congress forms a bonded validator set on the proof-of-stake blockchain network (e.g., on the second blockchain network 902) together with other members of the congress. That is, after deposit of digital assets as security (the deposit of which may be referred to as "bonding"), the members of the congress (which was formed through deposit on the first blockchain network 900) now act as miners on the second blockchain network 902, periodically generating new blocks for the second blockchain network 902.

After the congress has been formed, a node 102b which is a congress member may detect, at operation 1006, confirmation of a special transaction of digital assets on the proof-of-work blockchain network to the group public address. The transaction is determined to be special if it satisfies predetermined criteria which distinguish the transaction from a transaction that is used to join the congress. For example, the transaction may be determined to be special if it includes a particular flag, variable or attribute.

After detecting the special transaction, the node 102b may wait until at least a threshold number of blocks have been added to the blockchain of the proof-of-work blockchain network. This waiting period may reduce the risk of a possible reorganization of the blockchain on the proof-of-work blockchain network which could void the transaction at operation 1006. Thus, while not illustrated in FIG. 10, the method may include an operation of determining that at least a threshold number of blocks have been added to the blockchain of the proof-of-work blockchain network after detection of the special transaction.

After the threshold number of blocks have been added to the proof-of-work blockchain, the node 102b mints (at operation 1008) corresponding digital assets on the proof-of-stake blockchain network. These digital assets are minted in response to detecting the special transaction and are minted in a quantity that corresponds to the quantity of digital assets in the special transaction detected at operation 1006.

The minted digital assets are placed on the proof-of-stake blockchain network into an account associated with the owner of the public key which made the special transaction detected at 1006.

Thus, the party transferring the digital assets to the congress on the proof-of-work blockchain network resumes control of the digital assets on the proof-of-stake blockchain network. This party is now free to use these digital assets in various ways including, for example, transferring these digital assets to other accounts.

The minting is performed by a selected congress member. More particularly a congress member who also acts as a miner 906 for the proof-of-stake blockchain network is selected to generate a block by the proof-of-stake blockchain network. The probability of a node being selected is based on the quantity of digital assets that that node has staked. The probability may be proportional to the quantity of digital assets that the node has deposited to the congress public key.

Some time later, an owner of the digital assets may wish to transfer them back to the proof-of-work blockchain network (i.e., to the mainchain). To do so, they may issue a request to transfer the digital assets back to the proof-of-work blockchain network. Such a request may be issued in the form of a special transaction on the proof-of-stake blockchain network. This transaction may be special in that it is a transaction to a special unspendable address, which is an address to which funds should be sent when the sender wishes to transfer these funds back to the mainchain. That is, transaction may be special in that the address is a special address. At operation 1010, the node 102b may detect a request to transfer digital assets on the proof-of-stake blockchain network back to the proof-of-work blockchain network. For example, at operation 1010 there may be a mining of a transaction sending funds to the special address.

To guard against a reorganization, the node 102b may wait until at least a threshold number of blocks are added to the blockchain of the proof-of-stake blockchain network after detection of the request at operation 1010. Thus, while not illustrated in FIG. 10, the method 1000 may include an operation of determining that at least a threshold number of blocks have been added to the blockchain of the proof-of-stake blockchain network after detection of the request.

In response to detecting such a request and determining that the threshold number of blocks have been added to the proof-of-stake blockchain, the node 102b, at operation 1012, uses its private key share for the congress to cooperatively generate a valid signature for a transaction from the public group address. For example, the transaction may be circulated, either directly or via the sidechain by including the required information in transactions on the sidechain, between the members of the congress and members may add their partial signature until a valid signature is obtained, at which point the transaction may be broadcast to the miners 104 of the proof-of-work blockchain network. The transaction transfers the digital assets to an address on the proof-of-work blockchain network which may be an address associated with the node who issued the request detected at operation 1010.

The special address into which digital assets are transferred at operation 1010 is an unspendable address. Thus, transfer of the digital assets at operation 1010 burns the digital assets on the proof-of-stake blockchain to prevent double spending (i.e., the duplication of the digital assets over the two blockchains).

To enhance security at least a portion of the operations of the transfer may be performed in a trusted execution environment in a node. For example, the determination that at least a threshold number of blocks have been added to the blockchain of the proof-of-stake blockchain network may be performed within a trusted execution environment on the node. The node may also, prior to using the private key share, confirm the validity of the request detected at operation 1010 within the trusted execution environment. Generation and use of the private key share may also be performed within the trusted execution environment.

Securing for One-Way Bet Attack

To further enhance security, the protocol may include one or more safeguards to protect against a one-way bet attack. An example of a one-way bet attack occurs when a fraudster (i.e., a node associated with a malicious party) constructs a transaction on the mainchain which spends all or a portion of the digital assets under control of the congress (i.e., encumbered by the congress public key). The fraudster may provide the transaction to other members to add partial signatures. If a threshold number of private key shares associated with members participate, then a valid signature can be generated. If the threshold signature scheme that is used in the protocol is not an aggregate signature scheme (e.g., if ECDSA is used), then it may be difficult to identify members that contributed a partial signature. A member, who may be due for a pay-out if the fraud succeeds, could add their partial signature to the transaction and pass the transaction on without risking exposure as a party to the fraud. Adding a partial signature could then be viewed as a one-way bet since the worst that can happen is that insufficient partial signatures are collected to obtain a full signature.

The protocol may therefore, include one or more features for securing the protocol against the one way bet. For example, the TEE of each node may be configured to periodically attest to all transactions that they have partially signed and/or they may be required to broadcast such an attestation before their deposit is reclaimed. If a node attests to having added a partial signature to a transaction later judged (by a threshold of congress members) to be a fraudulent transaction, then such malicious activity may be detected by other honest member nodes (e.g., at operation 502 of the method 500 of FIG. 5). When such malicious activity is detected, the honest member nodes may cooperate to suspend the member (as described above with reference to operation 503 of the method 500 of FIG. 5) and/or to confiscate the digital asset(s) of the member (as described above with reference to operation 504 of the method 500 of FIG. 5). This technique, while useful in helping to secure the protocol against the one-way bet, can introduce overhead when periodic attestation is used. Further, where attestation is required prior to return of a deposit, fraud may not be detected for a long period of time.

The protocol may include other security measures in order to safeguard against the one-way bet. For example, an aggregated signature scheme, such as the Bon eh, Gentry, Lynn and Shacham "BGLS" scheme (*Aggregate and Verifiably Encrypted Signatures from Bilinear Maps*. International Conference on the Theory and Applications of Cryptographic Techniques, EUROCRYPT 2003: Advances in Cryptology, pages 416-432), may be used. Aggregate signatures allow different signers to sign different messages while only producing one signature, which can be validated in a 'single shot'.

In order to use BGLS, the TEE for each member may hold a single private key share for the threshold signature scheme used on the mainchain and a BGLS private key. The public key that corresponds to the BGLS private key may be referred to as the Share ID ("SID"). The BGLS private key may be a random number generated using a secure random number generator within the TEE. The private key share for the threshold signature scheme is a share that has been computed inside the TEE using a multi-party key generation protocol.

BGLS can provide a safe guard against the one-way bet in the following way. When a node pays into the congress public key for the purposes of enrolment (which may occur at operation 404 of the method 400 of FIG. 4), the enrolment transaction may include: i) the number and hash of the most recent block on the mainchain that the enclave has seen, and the number and hash of the most recent block on a second blockchain (i.e., the sidechain), that may be used as a broadcast channel for communication between members; ii) a quote (a hash of the initial contents of the memory within the enclave signed by the TEE's attestation key and bound to the SID).

Before requesting that a TEE provide data required for an enrolment transaction, a member must send all blocks on the mainchain and the second blockchain sequentially into their TEE, beginning with the genesis blocks for each blockchain. The TEE is configured to check the proof-of-work on the mainchain and to retain a record of the current membership, which may be obtained by analyzing the enrolment and disenrollment transactions. This allows the TEE to, independently (of its owner, for example), establish SIDs that are current. That is, it allows the TEE to establish SIDs that correspond to all current members of the congress.

To enroll (e.g., during operation 404 of the method 400 of FIG. 4), the (prospective) member constructs, signs and broadcasts the enrolment transaction, payable to the public group address for the congress, to the blockchain network that is the mainchain (e.g., to the first blockchain network 900 of FIG. 9). The enrolment transaction references UTXO sufficient for at least one key share. When the enrolment transaction is confirmed on the mainchain, the members of the congress may collaborate to issue a new key share to the enrolled members' TEE (e.g., as described above with reference to operations 704 of the method 700 of FIG. 7).

When the congress wishes to initiate a transaction of digital assets encumbered by the congress public key, a node in the congress may propose a transaction, T(M), on a second blockchain network (i.e., on an alt-chain such as a sidechain). The transaction, T(M), is, at this point, an unsigned transaction intended to transfer digital assets on the mainchain, M, which is proposed on the sidechain, A. That is, the second blockchain network (i.e., the sidechain) may be used as a broadcast channel. When one member wishes to communicate some information to all other members, they may put it on a transaction and send it to the sidechain.

The transaction, T(M), is deemed ratified on the second blockchain network (the sidechain) when at least a threshold number of blocks are mined on top of it. When the TEEs observe that the transaction is ratified (i.e., proposed and confirmed) on the second blockchain network (i.e., on the alt-chain, such as the sidechain), they broadcast a precommit. The precommit is comprised of a BGLS signature on the transaction, T(M), and the SID corresponding to the BGLS signature. The precommit is sent to the second blockchain network, so that it is shared with other congress members. That is, the precommit may be encapsulated in a transaction on the second blockchain network.

Once a threshold of precommits are observed by the nodes and, more particularly, by the TEEs into which the blocks of both the mainchain and the second blockchain network are input, the node will output a commit (a partial signature) on the transaction T(M) which has been precommitted to. The threshold may for example, be set at a simple majority of all current SIDs. The commit is sent, contained in a transaction, on the second blockchain network containing a partial signature on T(M), which references T(M).

When at least a threshold number of commits are observed in the second blockchain network to construct a full signature, the signed transaction, T(M), is constructed and broadcast to the first blockchain network (e.g., to the mainchain).

The use of the pre-commits can provide additional security since the properties of the aggregate signature scheme mean that a member cannot contribute a precommit without revealing their identity. That is, their identity is revealed in the form of the SID, which is associated with the member deposit during the enrolment procedure.

In addition to the measures described above, the TEEs associated with the nodes may be further configured so that a transaction is only committed or precommitted to if it has been ratified on the second blockchain network. For example, all blocks could be constructed within TEEs which are configured such that blocks will always contain precommits or commits to ratified transactions that require them (corresponding to the SID of the TEE in which they were constructed). Consequently, a member cannot refrain from sending commits or precommits to ratified transactions and continue to mine on the sidechain.

A node that observes a precommit to an unratified transaction on the second blockchain network may report such malicious behaviour to other members of the bonded validator set. The malicious member (identified by their SID) may be penalized through suspension and/or confiscation of the member deposit as described above. For example, in response to observing a precommit to an unratified transaction, the membership may cooperate to immediately suspend the SID so that it is no longer accepted for any further precommits and the guilty member is suspended from participation in the protocol. Further, once the transaction containing the incriminating evidence is confirmed in the second blockchain network, the guilty member's deposit may be confiscated and their deposit burned. The honest members may cooperate to reward the node that reported the malicious behaviour (e.g., by transferring at least a portion of the confiscated digital asset(s) to the node that reported the malicious behaviour). Thus, the application of the aggregate signature scheme in a precommit phase may strengthen the security of the protocol, for example, by preventing the one-way bet attack.

To safeguard against a member attempting to fool a TEE into determining that the current difficulty for the proof-of-work in the mainchain is less than its current difficultly, the TEE may be configured to take action when a sharp reduction in difficulty is observed. More particularly, if blocks are submitted to the TEE as they arrive, then the difficulty may be established from the time intervals between blocks. Any reduction in difficulty is expected to be gradual and a sharp reduction (a reduction may be determined to be "sharp" based on predetermined criteria) may be caused by a member attempting to fool the TEE by not providing blocks as they arrived, to make it appear as though the difficulty had dropped so that it would be easier to fake blocks of the proof-of-work mainchain. To provide further security, the TEE may be configured to respond to an observed sharp reduction in the difficulty on the mainchain by outputting a precommit to the new difficulty (along with a hash of the block and the block number) to be mined to the second blockchain network. The hash of the block is included to allow verification that the block corresponds to the new difficulty and the block number is included to allow other members to quickly compare the claimed difficulty/block hash with the block at the same height on their copy of the blockchain.

Only when it is provided with blocks for the second blockchain containing a threshold of precommits to that same difficulty, which correspond to other members that had their deposits in place before the sharp reduction in difficulty, will it recalibrate the mainchain difficulty and accept any new members enrolled on the mainchain since the sharp drop in difficulty was observed.

Where an aggregate signature scheme such as BGLS is used, the procedure for return of a member deposit may include additional requirements. For example, the node requesting a return of deposit may be required to attest (through its TEE) to deletion of both the private key share and the BGLS private key. Other member nodes may be configured to only include their precommit or partial signature in the transaction returning a member deposit to a withdrawing member if that withdrawing member has attested to deleting both the private key share and the BGLS private key.

The node for the withdrawing member may also be required to attest, through its TEE, to all transactions to which it has precommitted or committed. Other member nodes may be configured to only include their precommit or partial signature in the transaction returning a member deposit to a withdrawing member if that withdrawing member has not precommitted to any transactions that are determined to have been unratified.

Due to the procedures noted above, a malicious member is highly unlikely to benefit from withholding blocks from a TEE. The only precommits that a TEE could consider valid, other than those corresponding to confirmed SIDs, are those which correspond to BGLS private keys which no longer exist (and the only way this might occur with appreciable probability is if the member had not provided the TEE with up-to-date blocks and the TEE registered some members as current when, in fact, they had left the congress, deleted their key shares and reclaimed their member deposit). Further, as a consequence of the above, a member cannot induce their TEE to provide a precommit to a fraudulent (i.e., unratified) transaction and subsequently be granted return of their deposit by the congress. Thus, the member is motivated to ensure the TEE has up-to-date copies of the blockchains (i.e., the mainchain and alt-chain).

Thus, the protocol may be secured by configuring the nodes to operate according to a protocol that includes one or more of the following features: i) a TEE is configured to require a threshold of precommits to be observed on a second blockchain network (e.g., a proof-of-stake sidechain) before it will output a partial signature on the precommitted transaction; ii) a member deposit will only be returned if the TEE for that member a) attests to the deletion of the private key shares and the BGLS private key and b) all transactions to which it has precommitted and none of these is judged, (by consensus on the second blockchain network) to have been unratified; iii) any block constructed within a TEE will always contain (pre)commits to ratified transactions that require them (i.e., those ratified/precommitted transactions that are yet to gather a threshold of (pre)commits); and iv) The TEE may be configured to respond to an observed sharp reduction in the difficulty on the mainchain by outputting a precommit to the new difficulty (along with a hash of the block) to be mined to the second blockchain network. Only when it is provided with blocks for the second blockchain containing a threshold of precommits to that same difficulty, which correspond to other members that had their deposits in place before the sharp reduction in difficulty, will it recalibrate the mainchain difficulty and accept any new members enrolled on the mainchain since the sharp drop in difficulty was observed.

The protocol that supports the second blockchain network described herein may be layered on top of an existing proof-of-work public blockchain protocol, such as Bitcoin, without permission since it interacts through the construction of digital signatures via a multiparty protocol external to the mainchain (e.g., Bitcoin), meaning that it may operate without requiring the consent of the mainchain miners or developers. The protocol may therefore, by implemented "over" an existing public proof-of-work blockchain and is not contingent on modification to the protocol of that public proof-of-work blockchain. In this sense, the protocol may be added to a blockchain permissionlessly (since the blockchain protocol itself need not be modified to accommodate the further protocol).

The methods described above have been generally described as being performed at a node, but features of the method rely on cooperation with other nodes and could be performed elsewhere.

While the description above generally describes a congress is implemented on a proof-of-work blockchain network, the congress may instead, be implemented on a proof-of-stake blockchain network.

In addition to certain benefits and features already mentioned, techniques described herein may provide additional benefits. For example, the two-way peg may allow Turing-complete smart contract functionality to be added to a binary blockchain system which consists of an existing proof-of-work blockchain (such as Bitcoin) and a proof-of-stake sidechain. In a particular example, while the existing Bitcoin scripting language is not Turing-complete, Turing-complete scripting may be provided for Bitcoin using one or more of the techniques described herein. In another particular example, such functionality may be realized by endowing the proof-of-stake sidechain with a Turing-complete scripting language. Further, at least some of the techniques described herein can provide a proof-of-stake blockchain which does not suffer from the nothing-at-stake problem of previous suggestion implementations of proof-of-stake blockchains, the advantages of faster and more regular block creation associated with traditional proof-of-stake schemes. Further, at least some techniques described herein provide incentive for miners of a proof-of-stake mainchain to hold significant number of digital assets which increases the security of the proof-of-work mainchain.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of." The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A computer-implemented method of confiscating a digital asset, the method implemented by a processing resource, the computer-implemented method comprising:
   i) detecting malicious activity by a malicious party, wherein the malicious party is one of other members of a congress; and
   ii) confiscating at least a portion of digital assets previously transferred to a public group address by the malicious party.

2. The computer-implemented method of claim 1, wherein confiscating at least the portion of digital assets comprises transferring to an unspendable address.

3. The computer-implemented method of claim 2, wherein transferring to the unspendable address comprises using a private key share in cooperation with the other members of the congress to generate a valid signature for a transaction to the unspendable address.

4. The computer-implemented method of claim 1, wherein detecting the malicious activity comprises determining that a node associated with the malicious party is in breach of a pre-defined protocol or criteria.

5. The computer-implemented method of claim 4, wherein the malicious activity is detected at a node that reports faulty information to other members of the congress.

6. The computer-implemented method of claim 1, wherein confiscating the portion of digital assets comprises transferring to an unspendable address.

7. The computer-implemented method of claim 1, wherein confiscating comprises using a private key share in cooperation with the other members of the congress to generate a valid signature for a transaction to a spendable address.

8. The computer-implemented method of claim 1, wherein malicious behaviour is detected using verifiable secret sharing.

9. The computer-implemented method of claim 8, wherein detecting the malicious activity comprises determining that a node provides inconsistent key shares.

10. The computer-implemented method of claim 1, wherein the method further includes:
    i) detecting a redistribution request;
    ii) collaborating with other congress members to transfer all digital assets in the public group address to a new public address associated with a new public key; and
    iii) generating a new private key share.

11. A computer-readable storage medium comprising computer-executable instructions that, when executed, configure a processor to perform the method of claim 1.

12. An electronic device comprising:
    an interface device;
    a processor coupled to the interface device; and
    a memory coupled to the processor, the memory having stored thereon computer-executable instructions that, when executed, configure the processor to perform the method of claim 1.

13. The electronic device of claim 12, wherein:

the processor includes a trusted execution environment; and the computer-executable instructions are executed within the trusted execution environment.

* * * * *